(12) United States Patent
Chapman (10) Patent No.: US 7,466,442 B2
(45) Date of Patent: *Dec. 16, 2008

(54) PRINTING SYSTEM AND METHOD FOR CUSTOMIZATION OF A PRINT JOB

(75) Inventor: Edward Neil Chapman, Rochester, NY (US)

(73) Assignee: Eastman Kodak Company, Rochester, NJ (US)

( * ) Notice: Subject to any disclaimer, the term of this patent is extended or adjusted under 35 U.S.C. 154(b) by 1180 days.

This patent is subject to a terminal disclaimer.

(21) Appl. No.: 09/731,503

(22) Filed: Dec. 6, 2000

(65) Prior Publication Data

US 2002/0067498 A1    Jun. 6, 2002

(51) Int. Cl.
*G06F 15/00* (2006.01)

(52) U.S. Cl. ............... 358/1.18; 358/1.15; 358/1.12; 395/114

(58) Field of Classification Search ............ 358/1.18, 358/1.9, 1.12, 1.15; 395/114
See application file for complete search history.

(56) References Cited

U.S. PATENT DOCUMENTS

| 5,303,336 | A | * | 4/1994 | Kageyama et al. | 358/1.15 |
| 5,572,631 | A |   | 11/1996 | Kavathekar et al. | 395/115 |
| 5,867,709 | A |   | 2/1999 | Klencke | 395/702 |
| 6,006,279 | A | * | 12/1999 | Hayes | 719/328 |
| 6,441,919 | B1 | * | 8/2002 | Parker et al. | 358/1.18 |
| 6,509,974 | B1 | * | 1/2003 | Hansen | 358/1.12 |
| 6,606,165 | B1 | * | 8/2003 | Barry et al. | 358/1.9 |
| 6,727,999 | B1 | * | 4/2004 | Takahashi | 358/1.15 |
| 2003/0137688 | A1 | * | 7/2003 | Lawrence et al. | 358/1.15 |

* cited by examiner

Primary Examiner—Twyler L. Haskins
Assistant Examiner—Michael Burleson (57) ABSTRACT

A method and system of customizing a print job includes receiving an input of an application file. A preferential printing feature is selected from a group of preferential printing features. The printer driver associated with the preferential features is applied to the application file. The application file is printed using the printer driver.

16 Claims, 8 Drawing Sheets

PRINTING SYSTEM AND METHOD FOR CUSTOMIZATION OF A PRINT JOB

REFERENCE TO MICROFICHE APPENDIX

A Microfiche Appendix is included for reference and consists of a total of one microfiche and fifteen frames of various computer program code that relates to the invention.

COPYRIGHT NOTICE

A portion of the disclosure of this patent document, including the Microfiche Appendix, contains material which is subject to copyright protection. The copyright owner does not object to the facsimile reproduction by anyone of the patent document or the patent disclosure, as it appears in the U.S. Patent and Trademark Office patent file or records, but otherwise reserves all copyrights in the patent document whatsoever.

FIELD OF THE INVENTION

This invention relates to a printing system and method that supports dynamic or on-the-fly customization of a print job.

BACKGROUND

A standard printing architecture may include a hardware and software configuration that supports limited customization in executing a print job. To meet a customer's requirements for customization of a print job, a provider of printing software may modify a standard product with special software modifications. If multiple customers have special software modifications, the servicing and troubleshooting of printer problems may become uneconomical for the customers, the provider, or both. For example, standard documentation on a standard software product may no longer apply to a modified version of the standard software product. Further, modifications may vary from customer to customer, such that universal training of technicians on a standard software product is not helpful in troubleshooting. The software provider may be contractually obligated to provide quality assurance and certification tests for a software product. Differences in the design of the software products may make such quality assurance and certification tests more costly and difficult to implement.

Although numerous modifications of software are possible, the provider of printing software may use at least one of several typical techniques to customize standard software. In accordance with one technique, standard software instructions are modified to do raster image processing (RIP) and store the processed data to tagged image file format (TIFF) files to allow for printing at a later time. In accordance with another technique, the standard software instructions are modified to impose a transparent "mail-merge" application that is generally transparent to a user.

A software provider may even employ a special group of software engineers to create and provide technical support for the foregoing software modifications. The salaries, wages, benefits, and operating expenses of the special engineering group may add to the cost of the software products or reduce financial returns that might otherwise be possible. Moreover, the special group requires time to design and test software modifications to achieve the customization, which may delay the availability of modified printer software for anxious customers. Thus, a need exists for allowing for customization to the standard product and a print job without modifying the standard printing system in a non-uniform manner. Further, a need exists to be able to exercise the customization of a print job dynamically from within a print job.

SUMMARY OF THE INVENTION

In accordance with one aspect of the invention, a method and system of customizing a print job includes converting a received application file into a standard format, such as a page description language file format. A user selects a preferential document-processing feature (e.g., printing feature) from a group of printing features for the print job. The selected preferential document-processing feature (or a customization representative thereof) is associated with the application file. A printer selects an operative plug-in module or a sequence of plug-in modules based on the selected preferential document-processing feature. Further, the printer may print the application file using the operative plug-in module or a sequence of plug-in modules for the print job.

DETAILED DESCRIPTION OF THE INVENTION

Figure 1:
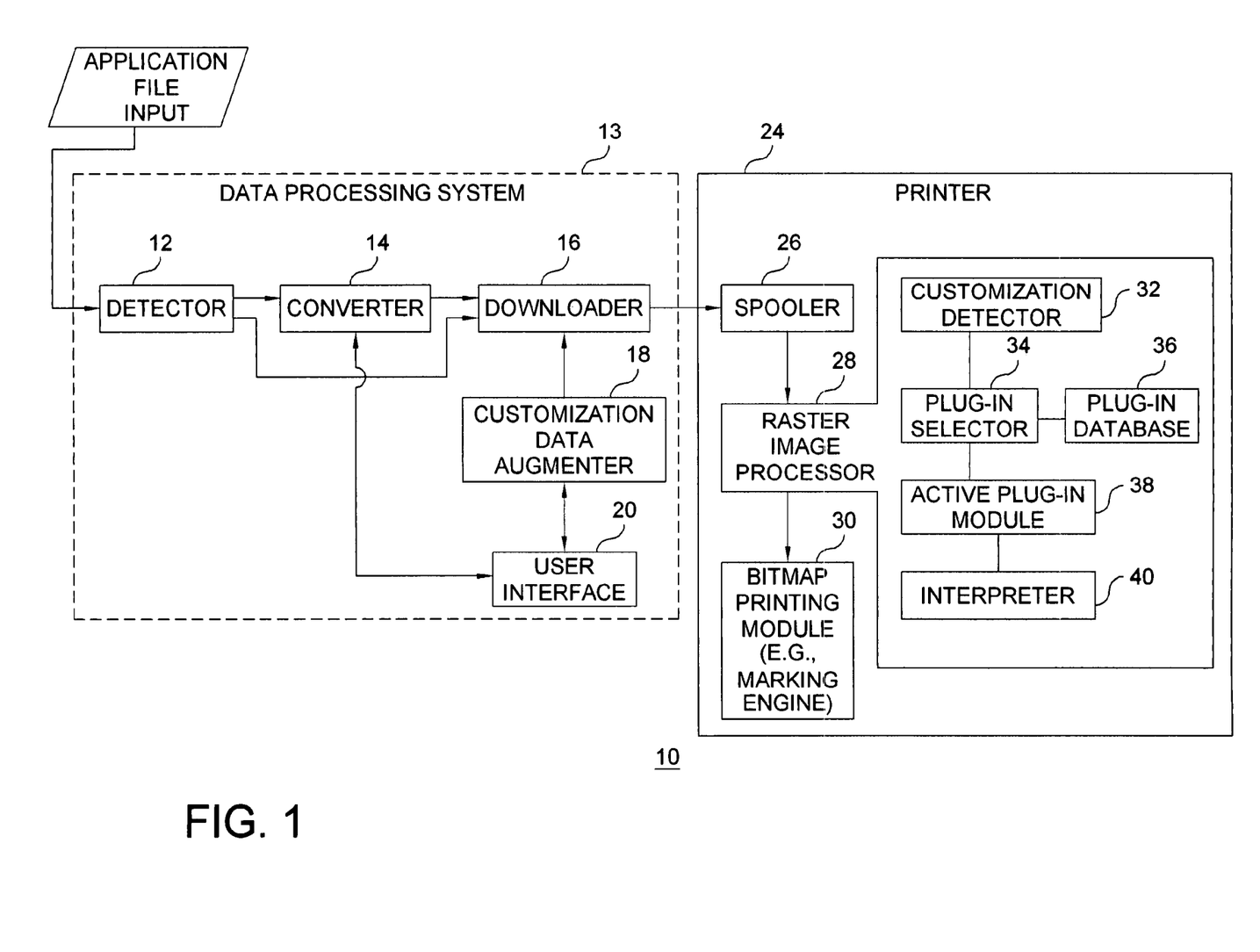
FIG. 1 is a block diagram of one embodiment of a system for supporting customization of a print job in accordance with the invention.

FIG. 1 is a block diagram of a printing system 10 for customizing a print job in accordance with the invention. The printing system 10 includes a data processing system 13 coupled to a printer 24. FIG. 1 shows the logical relationship of software components to one another in the printing system 10. The data processing system 13 and the printer 24 each may include a computer with one or more data processors. For example, the data processing system 13 or the printer 24 may include a data processor associated with memory and at least one databus for communicating with any electronic devices or hardware for supporting the operation of the software components of FIG. 1.

The data processing system 13 includes a detector 12 which may output data to a converter 14 or a downloader 16. A user interface 20 is coupled to the downloader 16 either directly or via a custom data augmenter 18 as shown in FIG. 1. Further, the user interface 20 may be coupled to the converter 14 to supervise the conversion process. The downloader 16 is coupled to a printer 24.

The printer 24 includes a spooler 26 that communicates with a raster image processor 28. In turn, the raster image processor 28 may communicate with a bitmap printing module 30 (e.g., a marking engine). The raster image processor 28 includes a customization detector 32 that detects the presence or absence of customization data in a print job outputted from the data processing system 13. The customization detector 32 communicates with a plug-in selector 34. The plug-in selector 34 may access a plug-in database 36 to select a plug-in module associated with detected customization data. The plug-in selector 34 provides an active plug-in module 38 as the selected plug-in module. An interpreter 40 communicates with the active plug-in module 38 to realize customization specified by or derivable from the customization data.

An application provides an application file to an input of the data processing system 13. The application file may represent a word-processing file, a spreadsheet file, a computer-assisted-drawing (CAD) file or any other file that is compatible with the data processing system 13. The application file may be in the form of a page description language (PDL) file or another data format.

A page description language (PDL) is a language that defines the layout and contents of a printed page. A PDL file may comprise a portable document format (PDF), a printer control language (PCL), or a PostScript file. Page description language may be object-oriented so that the page description language describes the layout and contents of a page in terms of geometrical objects, such as lines and curves.

Portable document format (PDF) is a file format developed by Adobe Systems Incorporated. The PDF format or another PDL format accepts formatting information from a variety of applications and provides a standard format that can be interchanged among different users. Hewlett Packard printer control language (PCL) was developed by Hewlett-Packard Company. A PostScript file is a file that expresses images in an object-oriented language in terms of vector graphics. The PostScript format treats images as geometrical objects or vector graphics that are represented by mathematical formulae. One example of a PDL file is an Adobe Postscript file. Adobe Postscript was developed by Adobe Systems Incorporated.

The detector 12 reads the application file or a portion of the application file (e.g., a header of the file) to determine whether the application file represents a PDL file or another format. If the application file represents a PDL file, the detector 12 routes the PDL file directly to the downloader 16. However, if the detector 12 determines that the application file represents a file other than a PDL file, the file is inputted into the converter 14.

The converter 14 converts the application file into a PDL file or another standard format that the printer 24 can understand, if the application file is not already a PDL file. A page description language (PDL) provides instructions for printing a document to a printer as bit-mapped graphics or vector graphics, for example. The converter 14 communicates with a downloader 16 to provide a converted application file in a PDL format or another standard format. The application file is placed in the PDL format so that the printer 24 can understand and interpret the application file.

The user interface 20 allows a user to enter preferences and to select document-processing features (e.g., printing features) of the printer 24 for a print job of the PDL file via the custom data augmenter 18 or otherwise. The selection of document-processing features is preferably made at the start or prior to the start of a print job to assure accurate execution of the instructions associated with the selection. A document-processing feature may include a printing feature, a preprint processing feature, and a post-print processing feature. For example, a pre-print processing feature may entail the selection of a particular print medium (e.g., color paper) and size of the printing medium. A post-print processing feature may entail stapling sheets or collating sheets after printing the sheets. A printing feature refers to a data parameter or instruction that may control the way the printer 24 prints a print job, the visual appearance of a print job or a portion thereof, or a physical characteristic of a completed print job. For example, printing features may include the selection of fonts, the resolution of images, and the selection of colors in which to print a document.

A plug-in module allocation program refers to a routine or an instruction set for determining the identity and sequence of plug-in modules to be used at the printer 24. Once a printer 24 selects an appropriate plug-in module, the selected active plug-in module 38 may conform to specifications that are established by an application programming interface (API). In one embodiment, the API is resident in the raster image processor 28. The API forms an interface between the raster image processor 28 and a custom library (e.g., dynamic linked library) associated with the active plug-in module 38. The API provides software instructions that support definition of and execution of the active plug-in module 38. The API is a specification or framework that each custom library (e.g., dynamic linked library) follows. A custom library may be used to do image processing, including rotation of the image or a portion of the image, storing an image, compression of an image, or taking out pixels of an image.

The customization data augmenter 18 may augment the PDL file or another file with customization data for interpretation by the printer 24. The user interface 20 supports a user's entering or specifying customization data for augmenting the PDL file or another file to be sent to the printer 24. A user interface 20 is coupled a customization data augmenter 18 for supporting a user's selection, activation, or deactivation of document-processing features of the printer 24 for a particular print job or jobs.

In one embodiment, the customization data represents a PDL comment. A PDL comment is data that is used to select or invoke printer features of the printer 24. For example, a PDL comment may express the application of one or more plug-in modules to an application file. A PDL may have a certain data structure that supports one or more of the following data fields: an indicator that indicates a start of the PDL comment, an indicator that indicates the data structure or syntax type of a PDL comment (e.g., in a proprietary data format, such as KDK custom), an identifier for a plug-in module, a turn-off command for the plug-in module, a turn-on command for the plug-in module, a sequence of execution for multiple plug-in modules, or other information.

The downloader 16 sends the PDL file and any accompanying customization data (e.g., PDL comment) to the printer 24. For example, the downloader 16 handles the transfer of a PDL file and an affiliated PDL comment to a spooler 26 or another component (e.g., buffer memory) of the printer 24. The transferred PDL file may refer to a file that results from the converter 14 converting an inputted application file. The downloader 16 arranges the PDL file in a suitable manner and protocol to enable transmission consistent with the transmission rate supported by the printer 24 (e.g., via a parallel port of the printer). In one embodiment, the downloader 16 supports dynamic customization of a print job by supporting dynamic or on-the-fly instructions to change or customize instructions to the printer 24.

A PDL file may be downloaded or sent to a spooler 26 of the printer 24 from the downloader 16. In turn, the spooler 26 sends the spooled files to a raster image processor 28 (RIP). Within the RIP 28 there are one or more interpreters 40 or interpretative instructions for the PDL's. The interpreters 40 turn the PDL file into bit-map images that the marking engine understands.

The spooler 26 represents a program that controls spooling or placing print jobs into a queue within electronic memory or another storage device managed by the printer 24. Spooling refers to simultaneous peripheral operations on line. An operating system of the data processing system 13 may support the spooler 26. Similarly, the application that is the source of the application file may support the spooler 26.

The spooler 26 places print jobs or portions thereof in a queue that is consistent with the processing capacity of the raster image processor 28. A buffer memory may be located within the spooler 26 to support the queue and provide buffering between the raster image processor 28 and the bitmap printing module 30. The spooler 26 allows the data processing system 13 to engage in other operations (e.g., processing another print job) while printing on the printer takes place.

A raster image processor 28 refers to hardware, software or both that converts a vector image into a bit-map image. A bit-map image refers to a representation of an image as pixels or dots that are arranged in rows and columns for storage in an electronic storage device or another storage device. One or more bits in electronic memory may be used to represent each dot or each pixel. For a color bit-map, multiple bits or bytes are required to represent each pixel.

A vector image represents an object-oriented image with vector graphics or object oriented graphics. Vector images may be expressed as mathematical formulae that define different components of the image. Vector graphics include the representation of alphanumeric characters in a form called scalable fonts or PostScript fonts. Most printing devices ultimately operate on bit-mapped images. Even PostScript printers generally convert vector graphics into bit-mapped representations for printing on the printer. The bit-mapped image or a portion thereof is provided to the bit-map printing module 30. The bit-map printing module 30 supports printing on the printing medium.

A bitmap-containing file may be used for storing, exchange, and printing images. TIFF (tagged image file format) is a standard file format for storing one or more images as bit maps. TIFF supports different sizes, resolution levels, and color variation of the images. If a TIFF is wrapped within a PS or PDF file, the resultant file supports the attachment of production print settings.

The raster image processor 28 includes a customization detector 32, a plug-in selector 34, a plug-in database 36, an active plug-in module 38, and an interpreter 40. The customization detector 32 determines if the data augmenter 18 has augmented the PDL file or another file downloaded to the spooler 26 from the downloader 16. For example, the data augmenter 18 may augment or tag the PDL file with a flag, a PDL comment a customization identifier, or other customization data that indicates customization is present. Further, different types of customization may be identified by customization identifiers associated with the PDL file.

Each customization identifier may be associated with a different corresponding plug-in or group of plug-ins. The plug-in selector 34 may select the appropriate plug-in module from a library of plug-in modules in the plug-in database 36 based on the customization identifier. Once the plug-in selector 34 selects the active plug-in module 38 or active group of plug-in modules, the active plug-in module 38 applies the plug-in instructions to the PDL file for execution of a print job. In the printer 24, the raster image processor 28 may detects the PDL comment as the customization data so it knows which plug-in modules to select in which order.

The plug-in module may be executed for a print job in the following manner: (1) at the start of the print job; (2) at the end of the print job; (3) within each image of the print job; (4) within each sub-image of the print job; or (5) in accordance with any of combination of the foregoing items. The plug-in module may have access to complete knowledge about the print job through the entry of customization data and other print job data via the user interface 20. The customization data may include the customization identifier that identifies an appropriate plug-in plus additional instructions that are necessary, helpful, or otherwise useful in carrying out customization.

A PDL, such as PostScript, has a dictionary that the plug-in module may reference to control various printing features. For example, the plug-in module may use a dictionary entry that the printer 24 references to turn on or off a particular printing feature. Two examples of standard dictionaries are called "procset" and "setpagedevice". "Procset" is a PostScript dictionary that is limited to a particular printer. "Setpagedevice" has more general or universal application to different printers, than does procset.

The raster image processor 28 includes one or more interpreters 40 with interpretive instructions for the page description language files or other files sent from the downloader 16. An interpreter 40 interprets instructions for placing the PDL file into bit-mapped images that the bitmap printing module (e.g., marking engine) of the printer 24 understands.

Figure 2:
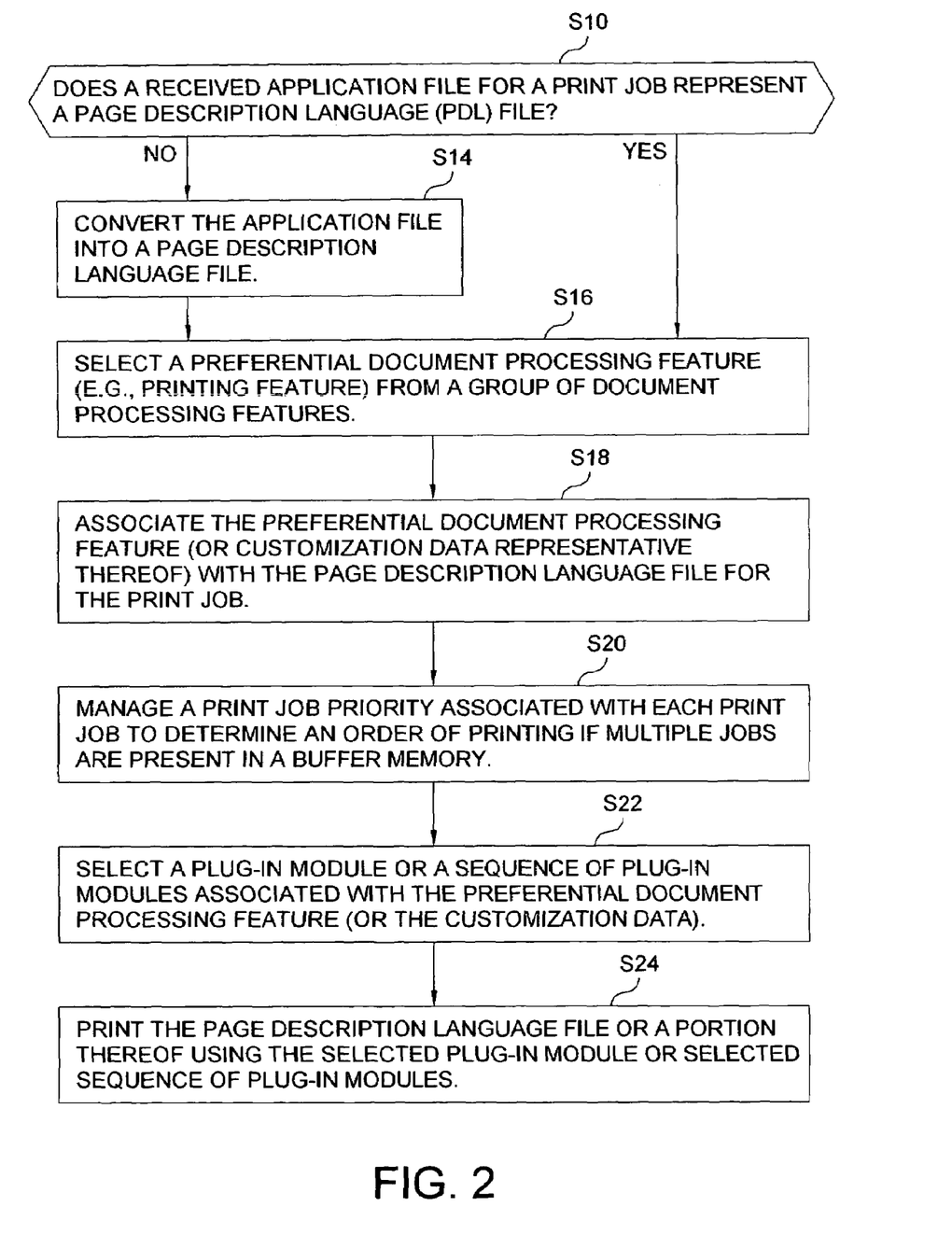
FIG. 2 is a flow chart of a method for supporting customization of a print job consistent with FIG. 1.

FIG. 2 illustrates a method of customizing a print job in accordance with the block diagram of FIG. 1. The method of FIG. 2 starts in step S10.

In step S10, the data processing system 10 receives an input of an application file. The data processing system 13 or a detector 12 detect if the application file represents a page description language file (PDL). A PDL file may comprise a portable document format (PDF), printer control language (PCL), or a PostScript file. In one example, the detector 12 may determine if the application file represents page description language file by reading a header of the application file. If the application file represents a page description language file, the method continues with step S16. However, if the application file does not represent a page description language file, the method continues with step S14.

In step S14, the data processing system 13 or the converter 14 converts the application file into a page description language file. For example, the application may extract portions of the inputted application file for placement into a template that conforms to a format of the page description language file.

In step S16, after step S14, the data processing system 13 selects a desired or preferential document-processing feature (e.g., printing feature) from a group of preferential document-processing features. The data processing system 13 may include a user interface that presents a user with a menu or library of different document-processing features. For example, a user may enter a preferential printing feature into a command line or a menu supported by the user interface 20.

In step S18, the data processing system 13 associates a preferential document-processing feature with the page description language file for the print job. A customization data augmenter 18 may represent the preferential document-processing feature as customization data (e.g., a customization identifier or a PDL comment) associated with the page description language file for the print job.

In step S20, the spooler 26 or the printer 24 manages a print job priority associated with each print job to determine an order of printing if multiple print jobs are present in a buffer memory of the spooler 26. In an alternate embodiment, step S20 may be omitted where a printing queue is not required.

In step S22, a printer 24 or a raster image processor 28 selects a plug-in module associated with the preferential document-processing feature or particular customization data. For example, the printer may detect the presence of the preferential document-processing feature or features by detecting the presence of the particular customization data or a customization identifier affiliated with the print job. The raster image processor 28 selects an appropriate corresponding plug-in module or sequence of plug-in modules that support the detected document-processing feature or features.

The selected appropriate plug-in module or plug-in modules substantially supports the preferential document-processing feature. In one embodiment, the plug-in modules in the plug-in database 36 or otherwise available preferably support an assortment of different document-processing features (e.g., printing features). In another embodiment, the document-processing features of each plug-in module may overlap. In yet another embodiment, the document-processing features of certain plug-in modules may be mutually exclusive to each other.

In step S24, the printer 24 or the bitmap printing module 30 prints the page description language file or a portion thereof using the selected plug in module or selected sequence of plug-in modules selected in step S22. The plug-in module may contain printing instructions, document instructions, or the like.

Figure 3:
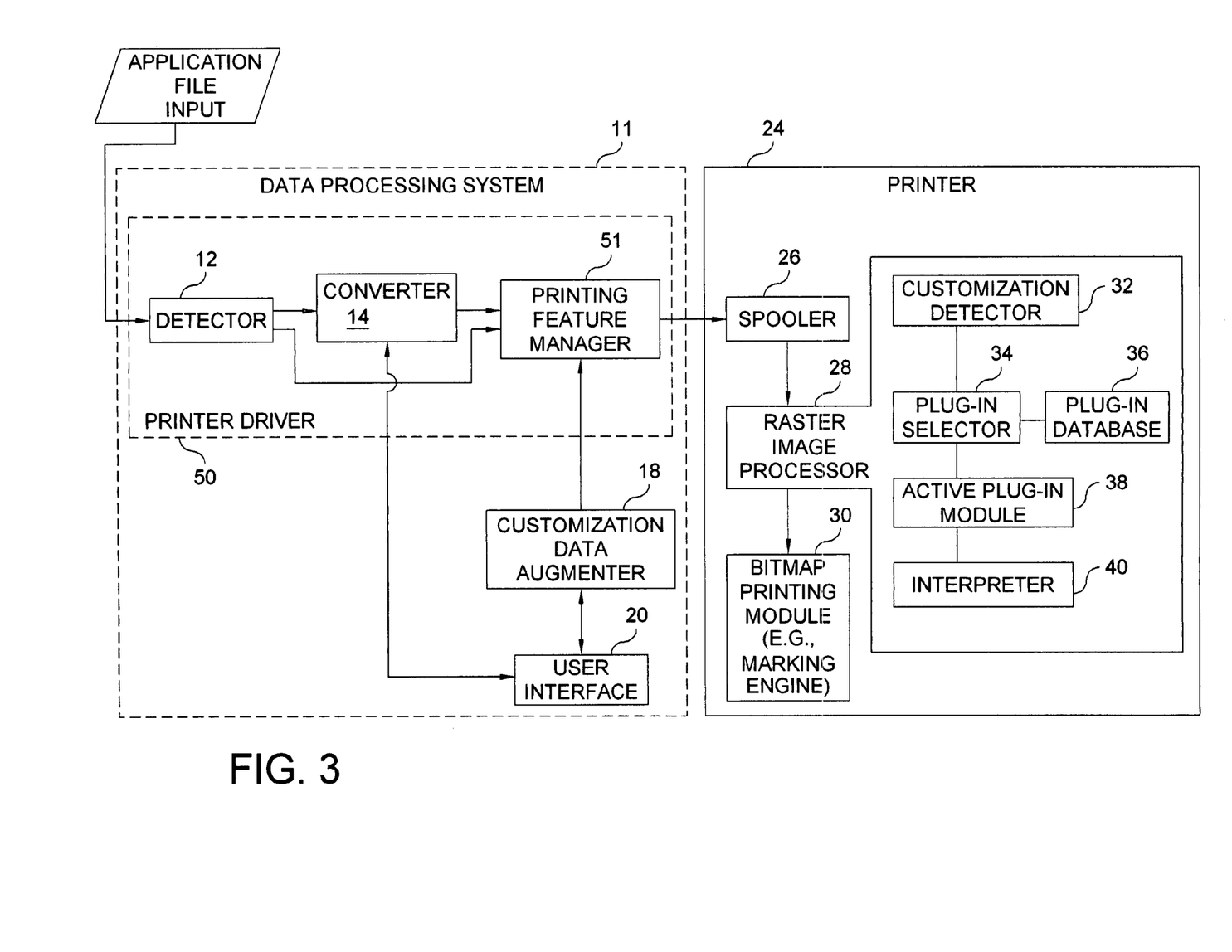
FIG. 3 is a block diagram of another embodiment of a system for supporting customization of a print job in accordance with the invention.

FIG. 3 is a block diagram of another embodiment of a printing system that supports the customization of a print job in accordance with the invention. The system of FIG. 3 is similar to the system of FIG. 1 except a printer driver 50 of FIG. 3 replaces the downloader 16 of FIG. 1. Further, the printer driver 50 may handle the functions of the detector 12 and converter 14 as well as the customization procedure as indicated by the dashed lines of FIG. 3. Like reference numbers in FIG. 1 and FIG. 3 indicate like elements.

A printer driver 50 is a software program that controls the operation of a printer 24. For example, the printer driver 50 may control the feeding of data to the printer 24 with proper control commands and data protocol. The printer driver 50 may be supported by the operating system of the data processing system 11.

The printer driver 50 includes a printer feature manager 51. The printer feature manager 51 manages the selection of document-processing features. A user may select preferential document-processing features via the user interface 20. The customization data augmenter 18 may append or associate customization data (e.g., PDL comment) with a document file of a print job to be transferred to the printer 24.

A printer driver may be tailored to support the specific features of a particular printer. A generic print driver may be tailored to support a group or class of printers. The downloader may be used to add options or additional features to the generic printer driver. For a PostScript document, the processing system may simultaneously convert from an application document to a PDL and apply the features of a printer driver. The printer driver may include a converter.

A user may select a printer driver for a print job via a user interface 20. A specific printer driver and a generic printer driver may support a different feature or set of features of the printer 24. For example, the specific printer driver may support a wider range of features of a printer 24 than the generic printer driver does.

A printer driver may have a user interface that supports various printing features, document-processing, or post-printing procedures (e.g., a stapler). The printer driver 50 may allow for customization of a print job by the selection of different plug-in modules to achieve different respective customization objectives of a print job. The printer driver 50 may support the customization of print job by invoking different plug-in modules. A printer driver usually outputs a PDL document. The printer driver selects customization by outputting a PDL comment. Certain printer drivers 50 are not based on a PDL comment, but rather a post "procset" or a "setpagedevice".

In the printer 24, the raster image processor 28 selects a preferential plug-in module or a sequence of plug-in modules to execute a print job based on the customization data (e.g., customization identifier) or the selected document-processing features. Each selected plug-in module may support one or more selected document-processing features. Further, a sequence of plug-in modules defined in the customization data may be necessary to carry out a selected document-processing feature.

Figure 4:
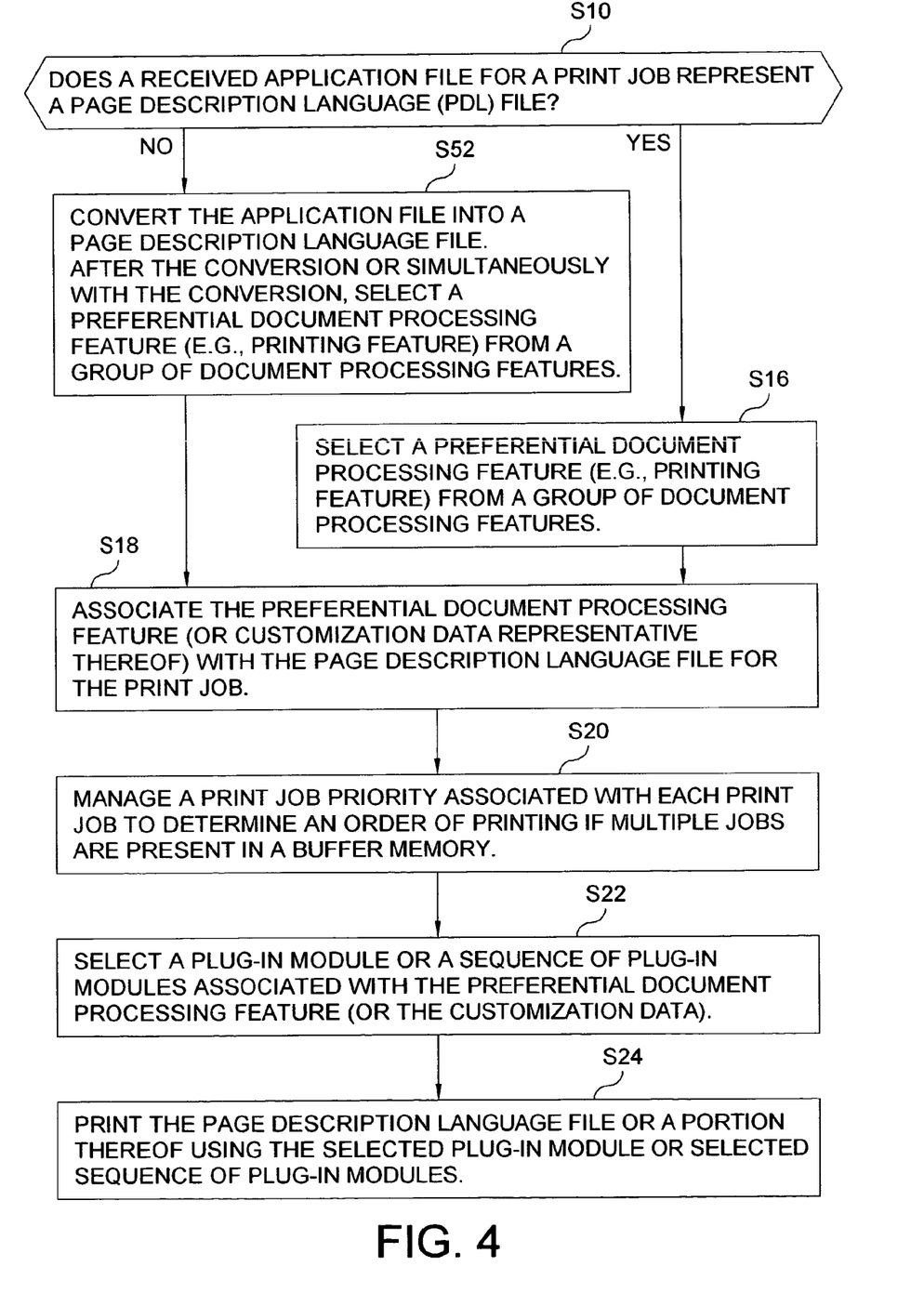
FIG. 4 is a flow chart of a method for supporting customization of a print job consistent with FIG. 3.

The method of FIG. 4 describes a method of customization of a print job consistent with the data processing system 11 of FIG. 3. The method of FIG. 4 is similar to the method of FIG. 2 accept the method of FIG. 4 may support the generally simultaneous or interleaved execution of the converting of the application file into a page description language file compatible with the printer 24 and the managing of the customization of the print job. Like reference numbers in FIG. 2 and FIG. 4 indicate like steps.

In step S10, the data processing system 11 or a detector 12 detect if the application file represents a page description language file (PDL). A PDL file may comprise a portable document format (PDF), printer control language (PCL), or a PostScript file. In one example, the detector 12 may determine if the application file represents page description language file by reading a header of the application file. If the application file represents a page description language file, the method continues with step S16. However, if the application file does not represent a page description language file, the method continues with step S52.

In step S52, the data processing system 11 or the converter 14 converts the application file into a page description language file. For example, the application may extract portions of the inputted application file for placement into a template that conforms to a format of the page description language file. Further, the printer driver 50 may simultaneously invoke the converter 14 and the printing feature manager 51 or invoke the converter 14 and the printing feature manager 51 in an interleaved or a temporally staggered fashion until a print job is completely processed by the printer driver 50. Accordingly, the printer driver 50 may convert a portion of the application file to a page description language file, followed by adding a selected document-processing feature to the converted portion through the cooperation of the customization data augmenter 18, the user interface 20, or both. Further, the foregoing assembly of the PDL file and the document-processing feature may form a cycle that is repeated until the print job is completely processed.

During step S52, the data processing system 13 selects a desired or preferential document-processing feature (e.g., printing feature) from a group of document-processing features for the entire print job, which may involve switching back in forth from the conversion of the application document to the customization and data augmentation procedure. The user may enter a preferential printing feature into a command line or a menu supported by the user interface 20.

Figure 5:
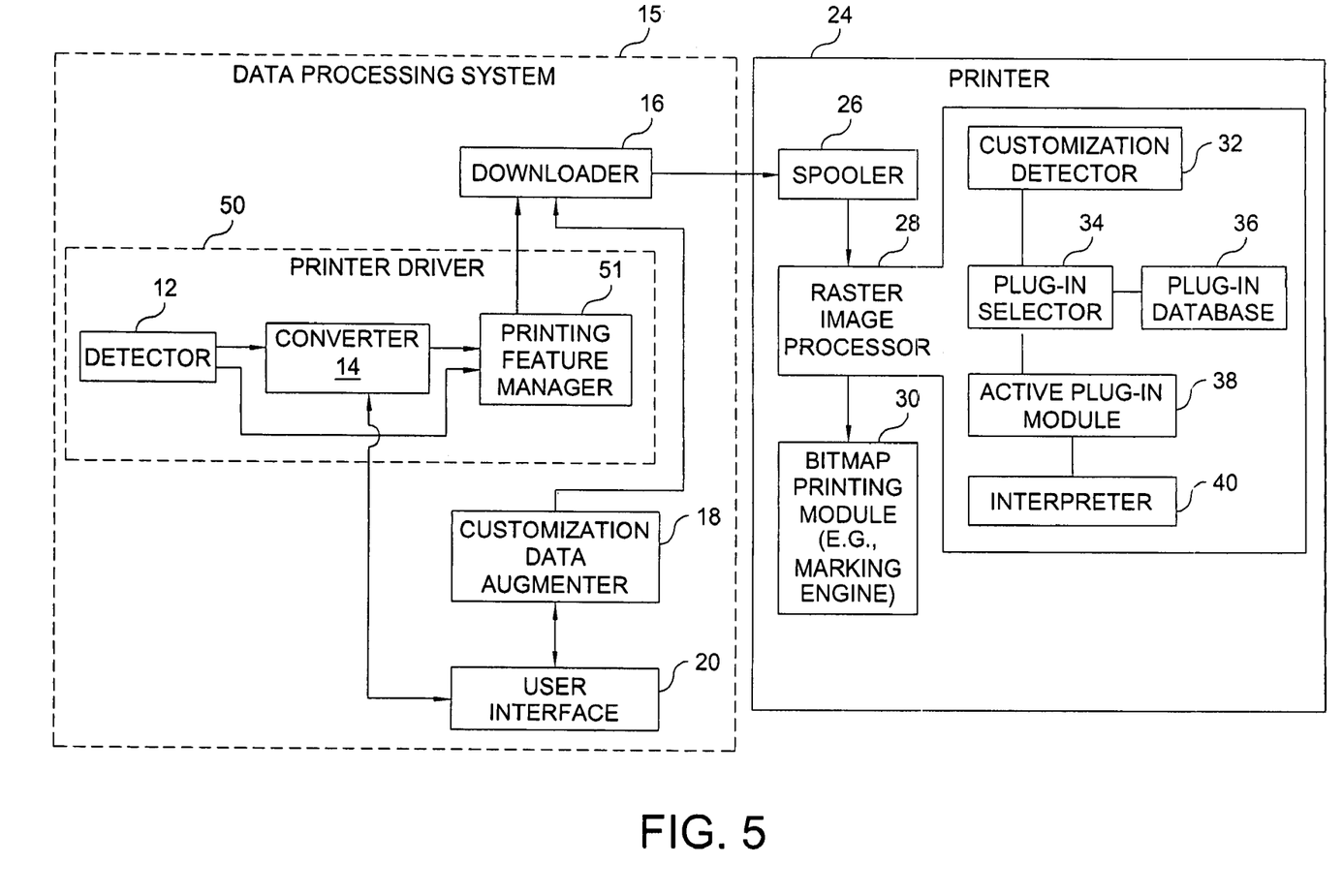
FIG. 5 is a block diagram of yet another embodiment of a system for supporting customization of a print job in accordance with the invention.

FIG. 5 is a block diagram of a data processing system in which the printer driver does not support a printing feature manager or only supports a printing feature manager with limited selection of document-processing features. Accordingly, a downloader is placed in cascade with the printer driver of the data processing system to permit the selection of document-processing features. Like reference numbers in FIG. 1, FIG. 3 and FIG. 5 indicate like elements.

In FIG. 5, the user interface 20 may be associated with both a downloader 16 and a printer driver 50. Here, the printer driver 50 may not support customization or a desired degree of customization. Accordingly, the downloader 16 provides supplementary customization.

The application programming interface (API) supports customization of plug-ins by allowing reference to a custom library. Here, the printer driver 50 may not support customization or a desired degree of customization. Accordingly, the downloader 16 provides supplementary customization. The user turns the customization(s) on or off with options with the customization data that augmented PDL files associated with the downloader 16. If the RIP 28 detects the customization(s) are turned on and the plug-in modules are installed, the RIP 28 executes at least one plug-in module or a portion thereof at an appropriate time relationship to the beginning of a print job, to the execution of an image of a print job, to the end of a print job, or any combination of the foregoing times. The customization inherits full knowledge about the print job besides its on state or off state.

Figure 6:
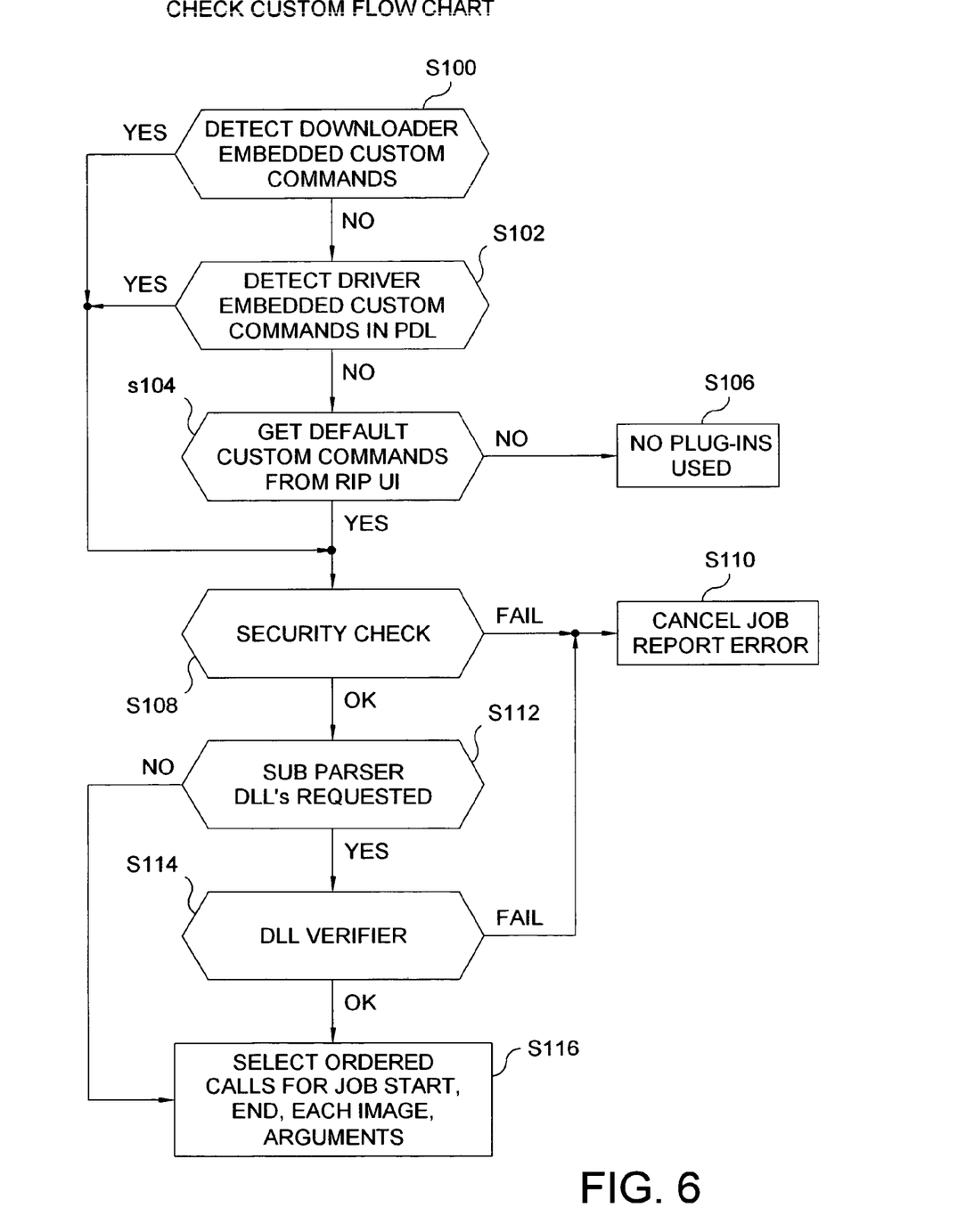
FIG. 6 is a flow chart of a method for executing a custom component (e.g., check custom procedure) of a plug-in module in the printer in accordance with the invention.

FIG. 6 is a flow chart of a method for executing a procedure associated with a plug-in module for the customization of a print job. In one example, the method of FIG. 6 may apply a definition of a plug-in module to customize a print job. In another example, the method of FIG. 6 may apply a definition of a sequence in which plug-in modules are applied to customize a print job. FIG. 6 relates to the "Check Custom" routine as set forth in the Microfiche Appendix (at frames 3-5).

In FIG. 6, the document-processing features may be represented as customization data in the form of downloader-embedded customization data, printer-driver-embedded customization data, or both. The downloader-embedded-customization data may represent customization commands for the printer 24 that are embedded by the downloader 16 into a PDL file. The printer-driver-embedded customization data may represent customization commands for the printer 24 that are embedded by the printer driver 50 into a PDL file. A customization command may contain a plug-in module identifier to be used to complete a print job. Further, a customization command may be expressed as arguments that supplement specified plug-in modules.

The method of FIG. 6 begins in step S100. In step S100, a parser of a printer 24 detects document-processing features (e.g., printer features) selected via a downloader 16. The "Check Custom" procedure determines which custom plug-in modules and arguments are used. In accordance with one embodiment, if the downloader 16 selects a plug-in module, the downloader's selection takes precedence over inconsistent printer driver selections of plug-in modules.

If the parser detects a downloader-embedded-custom commands, the method continues with step S108. If the parser does not detect downloader embedded commands, the method continues with step S102.

In step S102, an interpreter 40 of a printer 24 detects a document-processing feature in the form of a printer driver embedded custom command in a PDL file. The PDL file may be a converted representation of the application file, which was converted by converter 14. In one embodiment, one or more interpreters 40 detect printer features selected via a printer driver that is embedded in the PDL document. The "Check Custom" procedure is interested in which custom plug-in modules and arguments are used as set forth in the printer driver.

If the interpreter does not detect driver-embedded-custom commands in the PDL document, the method continues with step SI04. If the interpreter detects the presence of a printer-driver-embedded-custom commands, the method continues with step S108.

In step S104, the printer may get a default custom command from a RIP user interface. Accordingly, if the custom document-processing feature (e.g., printing feature) is not selected via a downloader 16 or a printer driver 50, the printer may use the default custom command. Further, arguments selected by a RIP user interface may supplement the functionality of the default custom command.

Although the default custom command may be expressed as a default plug-in module, in one embodiment no plug-in modules are used in step S106, following step S104. A default plug-in module may be stored in the plug-in module database and retrieved from the plug-in module database when necessary.

In step S108, a security checker of the printer 24 may verify that the user sending the print job to the printer 24 is an authorized user. An authorized user is licensed to use the printing software of the printer 24. Step S108 may be omitted where security or licensing confirmation is not required. If the user and the associated print job pass the security check, the method continues with step S112. If the user and the associated print job fail the security check, then the method continues with step S110.

In step S110, the printer cancels the print job and reports an error to a user interface. For example, the printer may display a printer error code on an alphanumeric display panel. The error code may indicate that the user is not authorized; the print job cannot be completed, or some other appropriate data message.

In step S112 after step S108, the sub-parser parses the sub arguments for document-processing features (e.g., printing features) when customization features are selected within a plug-in module component, which may be called custom. The printer 24 requests information from a dynamic linked library (DLL) to implement arguments of a plug-in module, sub-arguments of the plug-in module, or both.

A DLL provides the printer 24 with great flexibility in designing future plug-ins, which reference and link into the dynamic linked library. Accordingly, the software provider can ship its product without knowledge of which, if any, plug-in modules will be used in the future or how the plug-in modules will be used.

An example of DLL selections is entered via the user interface as follows: %KDKCustom: on (-dStore:arg1;Mail; CleanUp:arg2)

The foregoing DLL selection calls the "Store plug-in" module with argument "arg1", followed by the "Mail plug-in module" without an argument, followed by the "Cleanup" plug-in module with argument "arg2".

If DLL's are selected for the print job, the method continues with step S114. However, if DLL's were not selected for the print job, then the method continues with step S116.

In step S114, a DLL verifier of the printer 24 verifies the correct DLL plug-in modules are installed in the printer 24. For example, the correct DLL plug-in modules are installed if the plug-ins modules are present in the plug-in database 36. If the DLL verifier detects the presence of the correct DLL plug-in module or plug-in modules in the printer 24, the method continues with step S116. If the DLL verifier does not detect the presence of the correct DLL plug-in module or detects the absence of the correct DLL plug-in module or plug-in modules, then the method continues with step S110.

In step S116, which may follow step S112 or step S114, the printer selects the ordered calls within one or more selected plug-in modules. A selected plug-in module may include calls for a job start, a job end, an image, a portion of an image. Further, the printer returns arguments to the interpreter for each call of the print job. If DLL's are not used we are limited to one static plug-in module.

Figure 7:
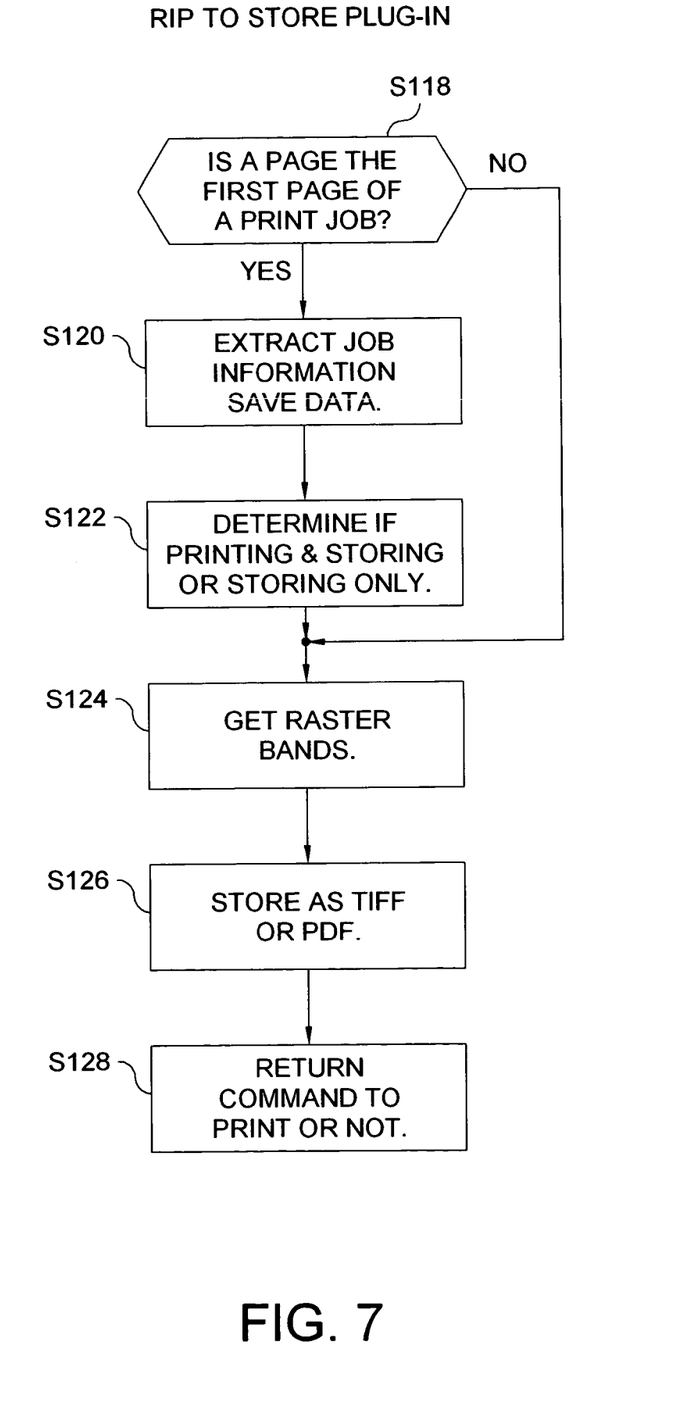
FIG. 7 is a flow chart of a method for executing a specific example of a plug-in module, called a raster-imaging-processing (RIP) to-store procedure in accordance with the invention.

FIG. 7 shows a specific example of a plug-in module in accordance with the invention. The plug-in module of FIG. 7 illustrates a RIP to store plug in module. The method of FIG. 7 relates to the "Custom" procedure of the Microfiche Appendix (at frames 13-15).

Custom start and custom end are not used in the RIP to store procedure of FIG. 7. However, another plug-in other than a RIP to store may or may not use custom start, custom end, or any combination of the foregoing data structures.

A plug-in module may be divided into three possible components: job start, custom, and job end. The RIP-to-store, plug-in module does not have commands associated with the job start and the job end. Rather, the RIP-to-store, plug-in module may have a stub function for the job start and the job end, where a stub function does not engage in any activity. The method of FIG. 7 starts in step S118.

In step S118, the printer 24 determines if a page being fed or about to be fed is a first page of the print job. If a page is the first page of a print job, the method continues with step S120. If a page is not the first page of a print job, the method continues with step S124.

In step S120, the printer 24 extracts job information from the print job data if the page is the first page of the print job. The printer may extract and save some information on the print job. For example, the printer may extract and save information on where to store the job by a job name.

In step S122 after step S120, the printer 24 determines if this is a store and print job or store-only job by checking the arguments associated with the print job.

In step S124, the printer 24 reads raster bands from memory (e.g., shared memory) of the interpreter 40.

In step S126 after step S124, the printer 24 may convert the raster bands into a TIFF document or a PDF document. The printer 24 converts the raster bands in such a manner to facilitate storage and/or subsequent processing of the stored document.

In step S128, the printer 24 sends a command to the interpreter 40 that instructs the interpreter 40 on whether or not to print the page. The command may also include printing instructions for printing the page.

Figure 8:
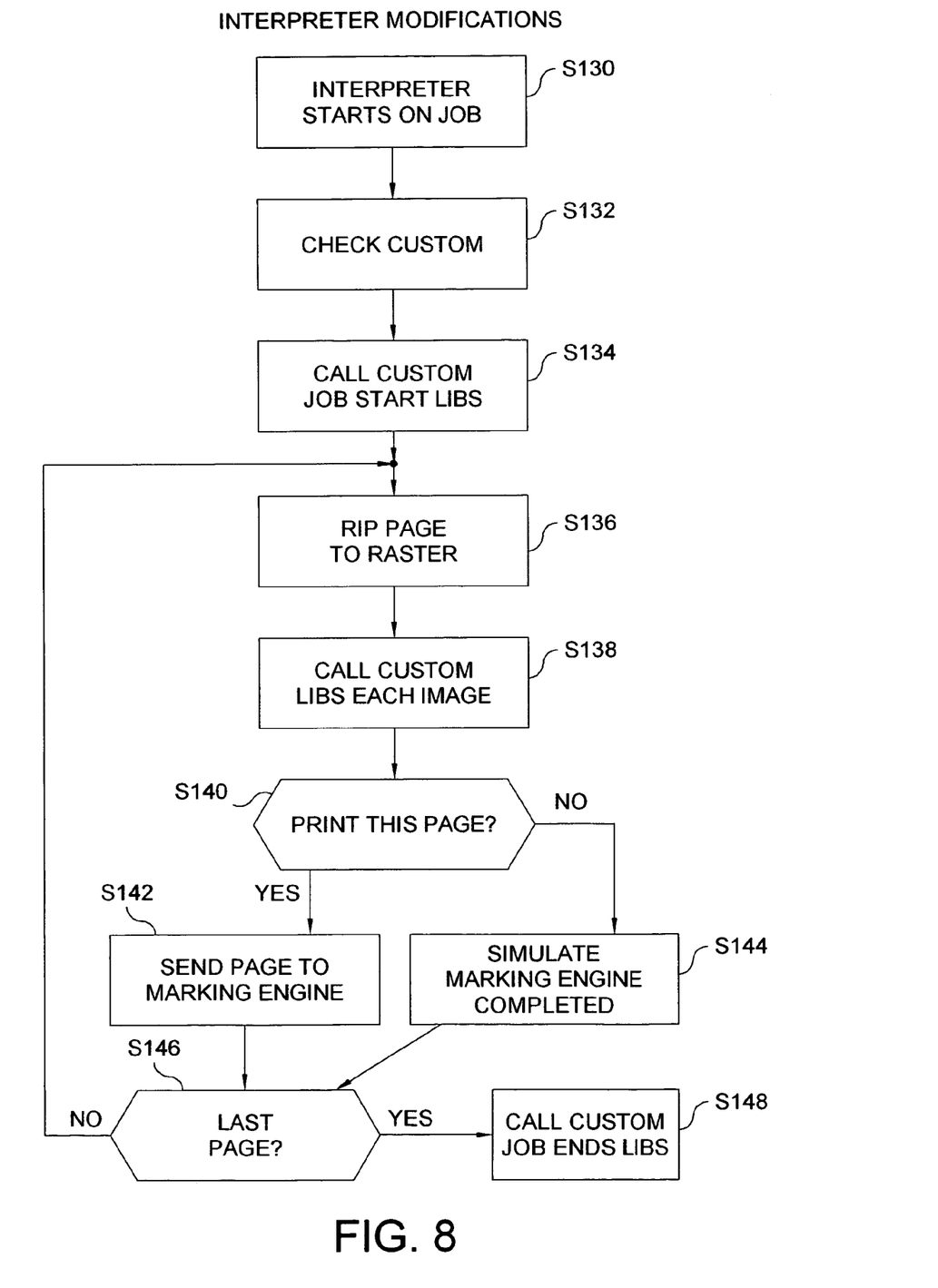
FIG. 8 is a flow chart of a method for modifying or customizing interpreter instructions of the printer in accordance with the invention.

FIG. 8 shows interpreter modifications in accordance with the invention. The application programming interface of the printer 24 has three data structures or entry points, which are called custom start data, custom data, and custom end data. Custom start data supports optional attributes of an API. An API may or may not include a custom start. The custom start data affects the beginning of a print job. For example, a custom start data may be invoked before starting image processing to execute a mail merge to get appropriate addresses to insert into a document of a print job.

Custom data supports attributes of an API. If a custom start data and a custom end data are not present in the API, then the custom is present. One example of an attribute supported by custom is a RIP to store. A RIP to store uses the custom alone, without the custom start of the custom end.

Custom end data supports optional attributes of an API. An API may or may not include a custom end. At end of a print job, the printer 24 may or may clean up (e.g., purge) that data from the print job or notify another process. The printer 24 could take the RIP and store and send out that data to other applications.

The three entry points of custom start data, custom data and custom end data provide a high degree of flexibility to customize a print job. The three entry points provide a skeletal framework that is applicable to meet a wide assortment of customization requirements in an organized manner. The method of FIG. 8 starts in step S130.

In step S130, an interpreter 40 starts processing of a print job. The interpreter 40 may be invoked during raster image processing. In one embodiment, an emulation sensor upstream of one or more interpreters 40 hands off the PDL document to the correct interpreter. After the handoff, the interpreter 40 or a group of interpreters 40 start on the job.

In step S132, the printer 24 calls the check custom procedure. The check custom procedure may involve modifications of the interpreter 40.

In step S134, the printer 24 calls custom job start data from a first library. The first library contains job start data. For example, the first library may represent a DLL that is dedicated to storing commands and arguments related to job start data. Prior to calling the custom job start data, the printer 24 may check the calls for validity by verifying conformance with syntax and/or data format.

The printer 24 can call multiple customization procedures (e.g., custom job starts) from a custom library in a defined order to customize one or more images within a print job, a print job, or both. The printer 24 can call multiple custom job starts from a custom library in a defined order to customize a print job. For example, the printer 24 may execute the following command, "%KDKCustom on (-dStore:arg1;Mail:CleanUp:arg2)". First, the printer 24 would call a first customization procedure, called "Store custom job start". Second, the printer would call a second customization procedure, called the "Mail custom job start" after calling the first procedure. Third, the printer 24 would call a third customization procedure, called the "CleanUp custom job start".

In step S136, a RIP page to raster is invoked. A RIP page-to-raster converts a PDL document into a bitmap for printing by the bitmap printing module of the printer. For example, in a loop, the interpreter processes each page to a bitmap for printing on the printer.

In step S138, the printer 24 calls a custom data from a second library. The second library contains custom data for customization of an image or a portion of an image of a print job. For example, the second library may represent a DLL that is dedicated storing commands and arguments related to job start data. Prior to calling the custom data, the printer 24 may check the calls for validity by verifying conformance with syntax and/or data format. The printer 24 can call multiple custom job ends in a defined order to customize one or more images in a print job, a print job, or both.

In step S140, the printer 24 determines if the page being fed is supposed to be printed. If the page being fed is supposed to be printed, the method continues with step S142. If the page being fed is not supposed to be printed, the method continues with step S144.

In step S142, the page is printed with the application of any called job start data from the first library and any called custom data from the second library. For example, the bitmap printing module (e.g., marking engine) may print the page with the application of the appropriate data.

In step S144, if the image is not to be printed, the printer 24 or the bitmap printing module may simulate that it was by communicating appropriate data to other software modules within the printer 24. The appropriate data may be a printing page complete data message.

After step S142 or step S144, the method continues with step S146. In step S146, the method determines if the last page printed or simulated, was the last page of a print job. If the last page printed is not the last page of a print job, the method continues with step S136. However, if the last page printed is the last page of a print job, then the method ends instep S148. In step S148, the printer 24 calls custom job end data from a third library. The third library contains custom job end data for customization of a print job. For example., the third library may represent a DLL that is dedicated to storing commands and arguments related to job start data. Prior to calling the custom job end data, the printer may check the calls for validity by verifying conformance with syntax and/or data format.

The invention supports the formation of unique plug-ins through an API (application programming interface). The invention supports the selection of different plug-ins from a group of plug-ins. The invention supports the order of execution of selected plug-ins. The invention eliminates or reduces the need to modify a standard product. Instead, different plug-in modules are implemented to carry out the desired features of a printer. The plug-in may be expressed in a PDL.

The degree of customization is commensurate with the variety and scope of plug-in modules, which may be organized in a plug-in database of the printer. Further, the degree of customization depends upon the degree of customization achievable by possible variations in the sequence of executing plug-in modules.

The customization may support various options and may permit on-the-fly cessation or suspension of printing. The plug-in modules refer to the hardware module, the software module, or both that add specific features or specific services to the printer. Therefore, an entire library of software plug-ins or hardware plug-ins may be necessary to implement customization that complies with user preferences.

Each plug-in module may be developed independently from the development of the standard printer or other plug-in modules. However, the scheme of the available plug-in modules is preferably planned or distributed throughout a spectrum of possible document presentations to afford a desired degree of customization. Moreover, plug-in modules may be deployed across different printing lines and models of printers in a standardized manner. Accordingly, technicians may be trained in accordance with the standard customization package that is applicable to a wide assortment of different printers to increase the efficiency of training and increase customer satisfaction. The documentation required to support different plug-in modules and printer modules is readily provided in a standard manner to increase customer satisfaction and reduce engineering resources necessary to troubleshoot faulty or defective operation in the field. The raster image processor 28, or the printer drivers that used in multiple different printers for customization may be readily standardized to great extent to increase customer satisfaction and reduce engineering resources necessary to troubleshoot faulty or defective operation of printers in the field.

The user interface 20 of any of the embodiments may represent an application program interface that allows a programmer and operator, or both, to set preferences and customize printing operations of a printer 24. The "Determine DL's" routine is set forth on frames 6-8 of the Microfiche Appendix to extract dynamic library data (e.g., DLL's) from previously defined process strings for customization. The application program interface may invoke one or more routines or tools for constructing plug-in software modules or software printer drivers in a dynamic fashion. For example, the user interface 20 may support the development of a customized printing arrangement in the field after a printer is shipped to an end user.

Further, the customization may support various document processing options and it may turn off printing. The Microfiche Appendix describes illustrative C language software code for various routines for supporting different printing features and customization, including the "CancelJob" routine at frame 11 for canceling a current print job. Development of the standard product and customization are decoupled from each other, allowing independent development and universal applicability of the customization. Accordingly, technicians may be trained in accordance with a standard customization package that is applicable to a wide assortment of printing software. One implementation of the invention may be a RIP.

The foregoing description of the invention describes several illustrative examples of the invention. Modification, alternative arrangements, and variations of these illustrative examples are possible and may fall within the scope of the invention. Accordingly, the following claims should be accorded the reasonably broadest interpretation, which is consistent with the specification closed herein and not unduly limited by aspects of the preferred embodiments disclosed herein.

The following is claimed:

1. A method of customizing a print job, the method comprising the steps of:
   receiving an input of a print job in a standard format in a printer;
   determining whether said print job has an embedded customization identifier;
   when said print job has said customization identifier:
   (1) locating in a database of different plug-ins compatible with said standard format, one or more plug-ins associated with said customization identifier;
   (2) executing said print job, said executing including applying said associated one or more plug-ins to said print job to customize said print job; and
   when said print job lacks said customization identifier, executing said print job without using said one or more plug-ins.

2. The method of claim 1 wherein said executing further comprises applying raster image processing using a plurality of interpreters.

3. The method of claim 1 further comprising customizing said associated one or more plug-ins.

4. The method of claim 1 wherein said executing of said print job has a start and an end and said applying is at one or more of said start, said end, and within each of a plurality of images of said print job.

5. The method of claim 4 wherein said executing of said print job has a start and an end and said applying is at both said start and said end.

6. The method of claim 4 wherein said applying is within each of a plurality of images of said print job.

7. The method of claim 1 further comprising, prior to said receiving:
   selecting one of a plurality of different preferential document-processing features, each said preferential document-processing feature being associated with a different set of one or more of the plug-ins of said database; and
   embedding said customization identifier in said print job, said customization identifier being associated with the respective said set of one or more plug-ins associated with said selected preferential document-processing feature.

8. The method of claim 7 further comprising embedding instructions with said customization identifier and using said instructions during said applying.

9. The method of claim 7 wherein said print job has a plurality of types of customization data, said data including said customization identifier, and said determining further comprises ascertaining a highest type in a precedence order of:

(1) customization data embedded by a data processing system downloader, (2) customization data embedded by a data processing system printer driver, and (3) customization data embedded by said printer; and wherein said locating and said applying use the ascertained said customization data of said highest type.

10. The method of claim 9 wherein:

said method further comprises accepting a user selection via a user interface of a data processing system separate from said printer when said plurality of types of customization data includes customization data embedded by said data processing system; and said method further comprises accepting a user selection via a user interface of said printer when said plurality of types of customization data includes customization data embedded by said printer.

11. The method of claim 1 wherein said print job has a dictionary having a plurality of entries, each said entry having an associated printing feature, and said one or more plug-ins reference one of said entries to change an on/off status of the respective said printing feature.

12. A system of customizing a print job, the system comprising:

a printer capable of receiving the print job in a standard format, said printer including:

a database of different plug-ins compatible with said standard format;

a customization detector determining whether said print job has an embedded customization identifier;

a plug-in selector locating in said database one or more plug-ins associated with said customization identifier, when said print job has said embedded customization identifier;

one or more interpreters executing said print job, executing including applying said associated one or more plug-ins to said print job to customize said print job, when said print job has said embedded customization identifier, said executing lacking said applying of said associated one or more plug-ins, when said print job lacks said customization identifier.

13. The system of claim 12 wherein said interpreters apply raster image processing during said executing.

14. The system of claim 12 wherein said associated one or more plug-ins are customizable.

15. The system of claim 12 further comprising a data processing system additional to said printer, said data processing system having a user interface capable of receiving a selection of one of a plurality of different preferential document-processing features, each said preferential document-processing feature being associated with a different set of one or more of the plug-ins of said database, said data processing system having a downloader embedding said customization identifier in said print job, said customization identifier being associated with the respective said set of one or more plug-ins associated with said selection.

16. The system of claim 15 wherein said downloader embeds instructions with said customization identifier, said instructions being usable by said printer during said applying.

* * * * *